March 2, 1943. H. NORBERG 2,312,354
ATTACHMENT FOR MILLING MACHINES
Filed May 16, 1942 2 Sheets-Sheet 1
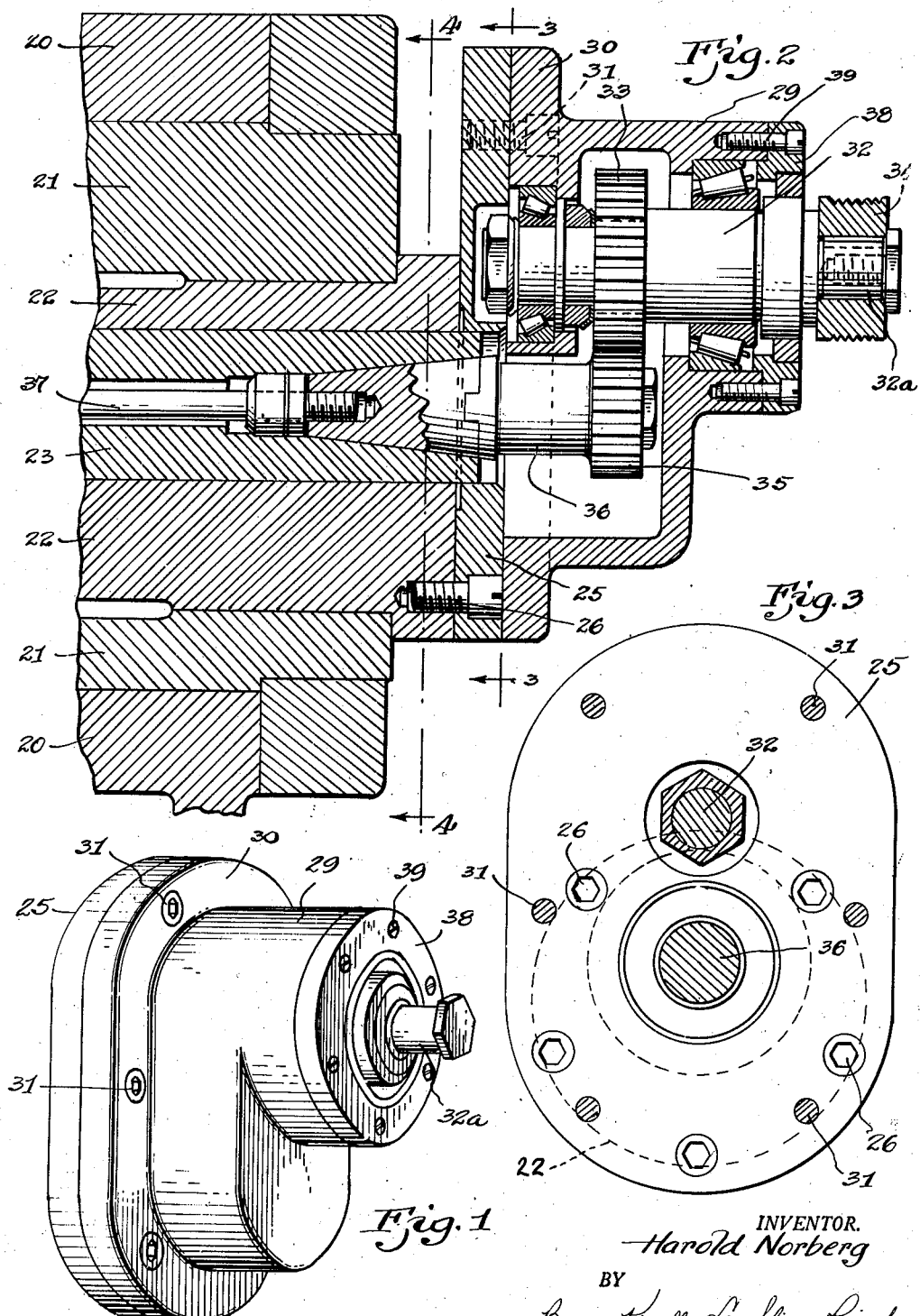
INVENTOR.
Harold Norberg
BY
Barnes, Kisselle, Laughlin & Raisch
Attorneys.

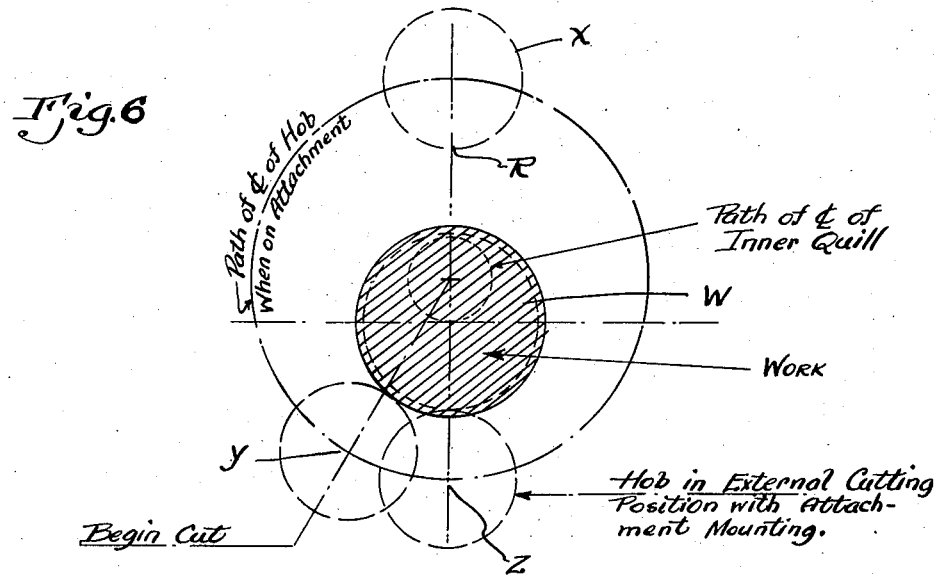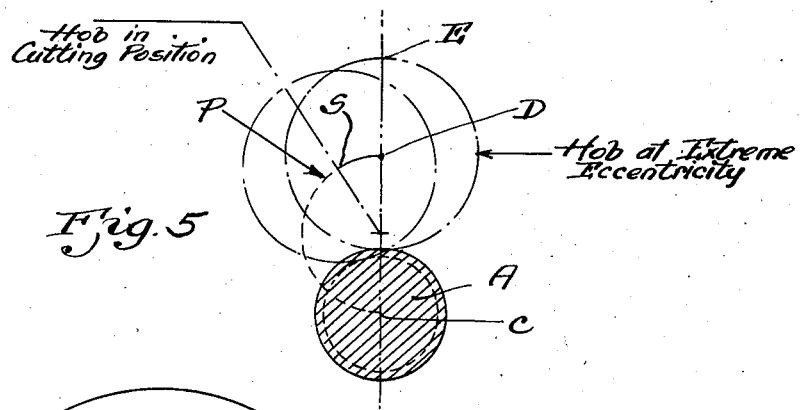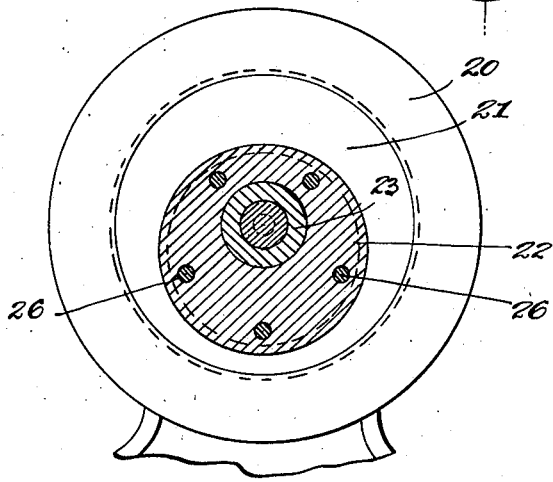

Patented Mar. 2, 1943

2,312,354

UNITED STATES PATENT OFFICE 2,312,354

ATTACHMENT FOR MILLING MACHINES

Harold Norberg, Detroit, Mich., assignor to The Gordon-R-Company, Royal Oak, Mich., a corporation of Michigan Application May 16, 1942, Serial No. 443,265

4 Claims. (Cl. 10—154)

This invention relates to a new combination embodied in an attachment for milling machines, particularly the planetary type.

Planetary milling machines are used to form external and internal threads particularly on the ends of work parts. The normal type of machine has a rotating spindle eccentrically mounted in an inner "quill" or hollow drum which itself is eccentrically rotatable in an outer "quill," the latter being concentrically mounted on the bed of the machine. The amount of eccentricity of the parts is limited first, by the size of the machine; second, by the accuracy required; and third, by the rate of feed-in to the work after the cutter reaches the surface.

Since for external threading the cutter must come into cutting position from its outer eccentricity and the size of the cutter subtracts from the eccentricity, the size of work which may be threaded externally is definitely limited. For example, on a standard planetary machine, an eight inch internal thread is easily cut but the maximum external thread which may be cut efficiently is one and one-half inches in diameter.

Attempts have been made to enlarge the capacity of such a standard machine for external threading by the use of a ring cutter having inwardly extending blades. This cutter is located eccentrically around the work and rotated by the machine. This has proved unsatisfactory for several reasons. The cost of the tool is almost prohibitive and it is extremely difficult to keep an adjustment in order that the proper length of the thread will be cut. In addition, the tool puts an unusually heavy load on the machine because of the long cut required, and the distance from the driving center to the cutting edge of the tool.

It is an object of the present invention to provide a simple means for increasing substantially the capacity of a standard milling machine to cut external threads.

It is a further object to provide a proper attachment which may be readily applied to a planetary mill to convert it and which has a cost less than one-tenth of the old ring-type external threader. With the present invention an ordinary hobbing tool can be used for external threading.

Briefly, the invention consists of an elongated housing, one end of which is mounted on what is referred to in a planetary mill as the inner "quill." On the extending end of the housing is a means for mounting a thread cutting hob on an axis parallel with the axes of the "quills" and spindle. Means is provided to drive the tool from the spindle of the machine so that upon operation of the machine, the tool will revolve and rotate in a path similar to the normal path of the spindle, but spaced outwardly therefrom.

Other objects of the invention and advantages of the combination will be brought out in the following detailed description.

In the drawings:

Fig. 1 is a perspective view of the attachment.

Fig. 2 is a sectional view of the attachment and a portion of a planetary milling machine on which it is fixed.

Fig. 3 is a view taken on line 3—3 of Fig. 2.

Fig. 4 is a sectional view on line 4—4 of Fig. 2.

Fig. 5 is a diagrammatic sketch showing external hobbing with no special attachment.

Fig. 6 is a diagrammatic sketch showing external hobbing using the attachment herein disclosed.

In Fig. 2 a frame structure 20 of a planetary milling machine supports the operating ends of an outer quill 21, an inner quill 22, and a spindle 23. Quill 21 is concentrically mounted in frame 20. Quill 22 is eccentrically mounted in quill 21 and spindle 23 is likewise eccentrically mounted in quill 22, see Fig. 4.

An elongated plate 25 has one end mounted on the face of quill 22 by bolts 26. The other end of the plate extends radially away from the axes of the members in the direction of the eccentric mounting of spindle 23.

A housing 29 having a base 30 of the same contours as plate 25, is mounted on the plate 25 by bolts 31. This housing supports a shaft 32 in suitable bearings and a gear 33 is located on the shaft. The end of the shaft is arranged to support a hobbing cutter 34. Gear 33 meshes with a gear 35 supported on a fixture 36 in spindle 23. A draw-bar 37 holds the fixture 36 in position. The fixture 36 is supported in the spindle where, under normal operation, the cutting hob is supported.

Hobbing cutter 34 is supported on an end 32a of shaft 32. A plate 38, held in place by bolts 39, serves to hold in place the bearing assembly for the shaft 32. The hobbing cutter 34 has been left off of Fig. 1.

Referring now to Fig. 5, a work piece is sectioned at A. In the normal operation of a planetary mill, a hobbing tool would be centered at C before the machine was started. Upon starting an external cutting job, the center of the hob would travel to a point D which would be the point of extreme eccentricity. For purposes of illustration, the hob has been shown at this point D as ready to cut into the work A. It then travels downward on path P to a point S where it is in final cutting position. Relative axial movement between the work and the hob will then cut the threads in the work A. It will be seen that for internal cutting the machine would have a greater capacity since it could cut a thread on a member having an internal diameter from the point C to a point E where the hob is at its extreme eccentricity. However, the only way that the capacity of the machine for external hobbing could be increased would be to cut down the diameter of the hob. It has been found that the diameter of the hob can be no smaller than the work to be done in order for efficient results. Consequently, the capacity of the machine for external hobbing is extremely limited.

In Fig. 6 is shown a diagrammatic presentation of the manner in which the present attachment increases the capacity of the machine. A work piece is sectioned at W. The path of the centerline of the hob when on the attachment, is shown by the largest circle as indicated, and the hob is shown at point X in its extreme eccentricity where it could handle external diameters from the center of the work to the point R. The hob is also shown at Y where it begins to cut and at Z where it is in final cutting position for work W.

In the operation, the housing 29 with plate 25, rotates with the eccentrically mounted inner quill 22. Meanwhile, the driving spindle 23 drives gears 35 and 33 to locate hobbing cutter 34. The effective eccentricity of the machine is, therefore, increased with a simple attachment which may be easily applied and which utilizes the cutting tools normally used for standard work.

What I claim is:

1. In a planetary milling machine of the type having one concentrically mounted outer member and two eccentrically mounted members within the outer member and one within the other, means for increasing the external thread cutting capacity comprising a housing mounted to turn with the outer eccentrically mounted member, driving means in said housing, means connecting said driving means to said inner eccentric member whereby rotation of said inner member is imparted to said driving member, driven means in said housing connected to and spaced radially in relation to said driving means, and thread cutting means driven by said driven member and extending from said housing.

2. In a planetary milling machine of the type having an outer quill, an inner quill, and a rotating spindle, means for increasing the thread cutting capacity of the machine comprising a housing mounted on the work end of said inner quill to rotate therewith and extending radially away from the axis thereof, driving means in said housing arranged to rotate with said spindle, driven means in said housing spaced away from the axis of said spindle, and means mounting and connecting a milling cutter to said driven means whereby rotation of said spindle will cause rotation of said cutter in a path radially spaced from the axis of the spindle.

3. In a planetary milling machine of the type having one concentrically mounted outer member and first and second eccentrically mounted members within the outer member and one within the other, means for increasing the external thread cutting capacity comprising an elongated housing having one end mounted on the working end of the first and outer eccentrically mounted member with the other end projecting radially away from the first member in the direction of the greatest eccentricity of the mounting of the second and inner member, a driven means in the projecting end of said housing, means connecting said inner member with said driven means whereby rotation of said inner member will impart rotation to said driven means, and means for mounting a tool to rotate with said driven means and to extend from said housing in a direction axially parallel with said members.

4. In a planetary milling machine of the type having one concentrically mounted outer member and first and second eccentrically mounted members within the outer member and one within the other, means for increasing the external thread cutting capacity comprising an elongated housing having one end mounted on the working end of the first and outer eccentrically mounted member with the other end projecting radially away from the first member in the direction of the greatest eccentricity of the mounting of the second and inner member, means in the projecting end of said housing for mounting a tool to revolve with said first member and to extend from said housing in a direction axially parallel with said members, and means connecting said last named means and said inner member whereby operation of said milling machine will cause simultaneous rotation and revolution of said tool.

HAROLD NORBERG.